United States Patent
Ramsey et al.

(10) Patent No.: US 7,747,413 B2
(45) Date of Patent: Jun. 29, 2010

(54) REAL TIME ANALYTICS THAT ACCOUNTS FOR SHIFTS

(75) Inventors: Mark S. Ramsey, Kihei, HI (US); David A. Selby, Hampshire (GB); Stephen J. Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 11/609,392

(22) Filed: Dec. 12, 2006

(65) Prior Publication Data

US 2008/0140346 A1 Jun. 12, 2008

(51) Int. Cl.
*G06F 17/18* (2006.01)

(52) U.S. Cl. ...................................................... 702/179
(58) Field of Classification Search ................. 702/179, 702/182, 199; 705/5, 8, 9, 11
See application file for complete search history.

(56) References Cited

U.S. PATENT DOCUMENTS

| | | | |
|---|---|---|---|
| 2005/0216324 A1* | 9/2005 | Maithell et al. | 705/8 |
| 2006/0020503 A1* | 1/2006 | Harris et al. | 705/11 |
| 2006/0056721 A1* | 3/2006 | Todd | 382/260 |

* cited by examiner

*Primary Examiner*—Mohamed Charioui
(74) *Attorney, Agent, or Firm*—Anna Linne; Hoffman Warnick LLC

(57) ABSTRACT

A system, method and program product for processing a stream of data events based on shifts. A system is provided comprising: a real time statistical processing system for updating a statistical summary each time a new data event is obtained, wherein the statistical summary is calculated based on the new data event and a previously calculated statistical summary; an analysis system that analyzes the statistical summary after it is updated; and a shift system that maintains separate statistical summaries for each of a plurality different shifts associated with the stream of data events.

17 Claims, 2 Drawing Sheets

REAL TIME ANALYTICS THAT ACCOUNTS FOR SHIFTS

FIELD OF THE INVENTION

The invention relates generally to analyzing event data, and more particularly to a system and method that accounts for shifts in real time data analysis.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing historical data can be a relatively slow process, and thus limits real time processing.

There exist various known techniques (e.g., running estimates, moving windows, etc.) for analyzing data events in real time (or near real time). Such techniques utilize little or no historical data to provide a statistical analysis of detected event values. Instead, they, e.g., maintain a running value, which is updated each time a new data event value occurs.

Because real time analysis techniques do not have the luxury of examining significant amounts of historical data, the efficacy of their results may be less than desirable, particularly where regular trends and patterns cannot be readily identified. For example, a given data event stream may be subject to a certain behavior (e.g., very high values) during one time period, and then subject to a different behavior (e.g., very low values) during a second time period, and then revert back to the first behavior during a third time period, etc. This type of "shifting" behavior significantly impacts the ability to analyze individual data events.

Accordingly, a need exists for a system and method of providing real time data analysis for data events subject to shifting behaviors.

SUMMARY OF THE INVENTION

The present invention addresses the above-mentioned problems, as well as others, by providing a system, method and program product for processing a stream of data events that can account for shifts. In a first aspect, the invention provides a system for processing a stream of data events based on shifts, comprising: a real time statistical processing system for updating a statistical summary each time a new data event is obtained, wherein the statistical summary is calculated based on the new data event and a previously calculated statistical summary; an analysis system that analyzes the statistical summary after it is updated; and a shift system that maintains separate statistical summaries for each of a plurality of different shifts associated with the stream of data events.

In a second aspect, the invention provides a computer program product stored on a computer readable medium, which when executed, processes a stream of data events based on shifts, the program product comprising: computer program code configured for updating a statistical summary each time a new data event is obtained, wherein the statistical summary is calculated based on the new data event and a previously calculated statistical summary; computer program code configured for analyzing the statistical summary after it is updated; and computer program code configured for maintaining separate statistical summaries for each of a plurality of different shifts associated with the stream of data events.

In a third aspect, the invention provides a method of processing a stream of data events based on shifts, comprising: obtaining a new data event; determining if there is a shift change from a first shift to a second shift; when there is no shift change, updating the statistical summary associated with the first shift; when there is a shift change: storing the statistical summary associated with the first shift, replacing the statistical summary associated with the first shift with a statistical summary associated with the second shift, and updating the statistical summary associated with the second shift.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
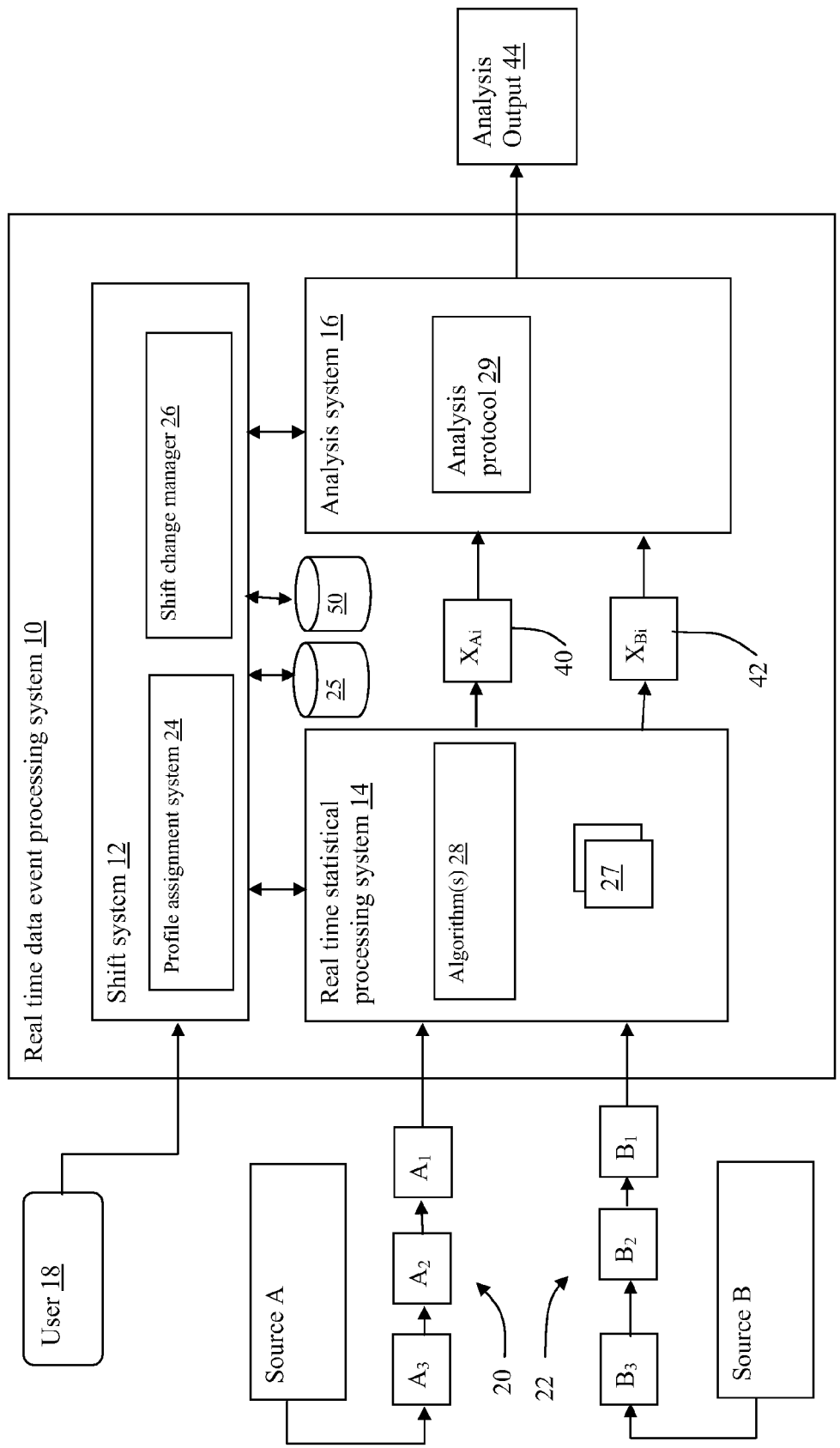
FIG. 1 depicts a real time data event processing system in accordance with an embodiment of the present invention.

Referring now to drawings, FIG. 1 depicts a real time data event processing system 10 that receives and processes streams of data events (i.e., "streams") 20, 22 from associated sources, e.g., source A and source B. Data contained within the streams 20, 22 may comprise any type of information that is created, generated, transmitted and/or received (i.e., "obtained") over time. In some instances, streams 20, 22 will comprise values, e.g., withdrawal amounts, bit usage, etc., whereas in other instances, streams 20, 22 may simply comprise binary values resulting from an occurrence or non-occurrence, e.g., a login, a withdrawal, building entry, etc. Although the embodiment of FIG. 1 is shown processing two streams 20, 22, it is understood that real time data event processing system 10 can be implemented to process any number of streams, i.e., one or more.

Real time data event processing system 10 generally includes: (1) a real time statistical processing system 14 that calculates/updates a statistical summary 40, 42 each time a new data event is obtained; (2) an analysis system 16 that analyzes the statistical summary 40, 42 to provide an analysis output 44; and (3) a shift system 12 for separating the data processing/analysis into different shifts.

In one illustrative embodiment described herein, the statistical summary is generated in real time as a running estimate calculated, e.g., using exponential smoothing. In such a technique, the historical data is essentially "built in" to the currently calculated estimate, thus providing a statistical summary in a single value (or set of values). As noted above, one of the challenges with such a technique is that the statistical summary may lack efficacy in an application subject to significantly different behavior patterns. For example, in an application that tracks computer bandwidth usage, very different behaviors may be expected between day and night. Namely, during the day shift, much more usage is expected than during the night shift. Thus, data events captured during the day shift could have an undesirable statistical impact to data events captured during the night shift, and vice versa.

Accordingly, shift system 12 is provided to separately process data events according to the shift during which the event occurred. For the purposes of this disclosure, a shift may be defined as a series of reoccurring sessions that share a common attribute. Shifts can be time driven, e.g., a day shift, a night shift, etc., or activity driven, e.g., a log in, an entry into a building, etc.

Shift system 12 includes a profile assignment system 24 for assigning a shift profile to each stream 20, 22, and a shift change manager 26 for managing shift changes occurring within each stream. Profile assignment system 24 may for instance include a user interface to allow a user 18 to assign shift profiles to different streams. In other instances, shift profiles may be assigned to streams dynamically, e.g., based on heuristics, etc. A more detailed explanation of shift profiles and related profile definitions are discussed below with respect to FIG. 2.

Shift change manager 26 is responsible for storing and retrieving a statistical summary for a stream of event data whenever a transition between shifts occurs for that stream. Accordingly, shift change manager includes a system for recognizing shift changes. In one embodiment, shift change manager 26 continuously compares a current condition (e.g., time of day, login status, etc.) with the shift profile of each stream. When a shift change is detected for a stream, shift change manager 26 stores the current statistical summary associated with the ending shift in a shift database 25 and retrieves the statistical summary associated with the beginning shift from the shift database 25. Thus, for example, at the end of a day shift and beginning of a night shift, the day shift statistical summary is stored and the statistical summary for the night shift is retrieved.

As noted, real time statistical processing system 14 processes streams of data events 20, 22 to generate a running statistical summary 40, 42 using a selected statistical algorithm 28. In general, a statistical summary (e.g., $X_{A2}$) is calculated based on the previously calculated statistical summary (e.g., $X_{A1}$) and the current data event (e.g., A2). Thus, the previously calculated statistical summary must be stored in a temporary storage area 27 by real time statistical processing system 14 until the next data event is received. When a shift change occurs, shift change manager 26 replaces the previously calculated statistical summary in the temporary storage area 27 with a statistical summary that is associated with the new shift.

Note that real time statistical processing system 14 may provide and utilize any type of algorithm 28 for processing incoming event data, and different streams can be assigned different algorithms 28. For example, in some cases, event data may be received at regular time intervals (e.g., $A_1, A_2, A_3$), and in other instances event data may be received at irregular time intervals (e.g., $B_1, B_2, B_3$). In one illustrative embodiment, events received at regular time intervals may be processed, e.g., with a complex exponential smoothing algorithm, such as:

$$X(n+1)=KC^*X(n)+(1-K)^*E(n+1)$$

where K is a damping factor, C is a complex number E(n+1) is a current data event value, and X(n) is a previous running estimate. Alternatively, events received at irregular time intervals may be processed with a variation to the above algorithm, such as:

$$X(T')=E(T')+X(T)^*K^{(T'-T)}.$$

where E(T') is a current data event value at time T', X(T) is a previous running estimate at time T, and K is a smoothing factor.

Moreover, as is described in further detail below with regard to FIG. 2, different algorithms 28 could be assigned to different shifts within a stream. For example, during a first shift, an algorithm may be utilized having a damping factor of K=0.5, and during the night shift, the damping factor may be changed to K=0.75.

In the simple case where, e.g., event data is collected at regular time intervals that correspond to a shift transition, shift change manager 26 simply stores the previously calculated statistical summary for future use in the shift database 25. In other cases where, e.g., event data is collected at irregular time intervals that do not correspond with a shift transition, shift change manager 26 may have to modify the previously calculated statistical summary based on the timing of the shift change before it can be stored away.

An example of such an implementation is as follows where X(t) represents the statistical summary at time t, and X(T) is the previously computed statistical summary. Assume a given shift (e.g., a Monday day shift) has an end time SET, and the next equivalent shift (e.g., a Tuesday day shift) has start time SST. At end of shift SET, shift data X(T') and T' are computed and stored, where:

$$X(T')=X(T)^*K^{(SET-T)}$$

and T'=SET. At the start of the next equivalent shift SST, the shift data 26 is utilized to reestablish X(T') and T'. Namely, $$X(T)=X(T')$$

T'=SST

Analysis system 16 provides mechanisms (e.g., algorithms, programs, heuristics, modeling, etc.) for identifying suspect data event values based on the statistical summaries 40, 42, and for generating an analysis output 44. Illustrative types of analysis may include identifying potentially fraudulent activities, identifying trends and patterns, identifying risks, problems, problems, etc. For example, a high statistical summary may indicate an unusual bank withdrawal activity, an unusual amount of bandwidth usage in a network, etc.

In a simple application, analysis system 16 might compare a statistical summary to a threshold. If the statistical summary is above (or below) the threshold, analysis system 16 may issue a warning as the analysis output 44. Analysis system 16 may include an analysis protocol 29 that can be configured to react differently depending on the shift, e.g., suspect data may cause a warning during the night shift and be logged during the day shift.

Figure 2:
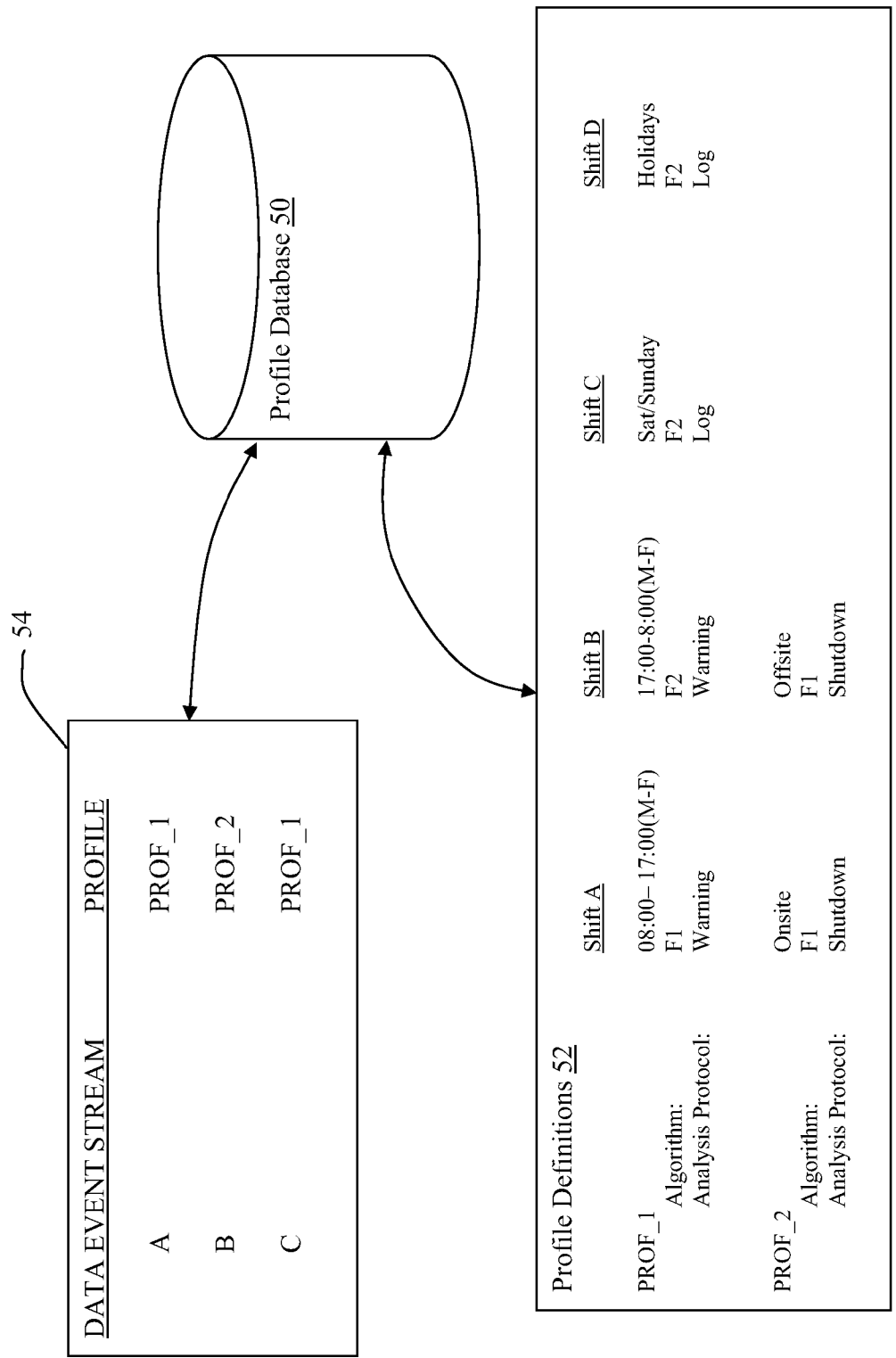
FIG. 2 depicts a profile database configuration in accordance with an embodiment of the present invention.

FIG. 2 depicts an illustrative implementation of a profile database 50 for providing shift profiles. Included is a first table 54 that assigns data event streams to defined shift profiles. For example, data event stream A is assigned to profile PROF_1, etc. A second table provides profile definitions 52 that break down shift profiles by shifts. For example, PROF_1 has four shifts (A, B, C, and D) and each shift defines a particular time period. For instance, shift A goes from 08:00-17:00, Monday-Friday (work hours); shift B goes from 17:00-8:00, Monday-Friday (off hours); shift C is weekends; and shift D is holidays. PROF_2 has two shifts (A and B) that are activity driven, i.e., shift A occurs when a worker is onsite (in the building) and shift B occurs when a worker is offsite (out of the building).

In addition to defining shift boundaries, profile definitions 52 can define the algorithm 28 and analysis protocol 29 to be used during a given shift (FIG. 1). Thus, for example, during shift A, PROF_1 uses algorithm F1 and analysis protocol "warning," and during shift C uses algorithm F2 and analysis protocol "log."

In general, real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time event data processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for processing a stream of data events based on shifts, comprising:
    a real time statistical processing system for updating a statistical summary each time a new data event is obtained, wherein the statistical summary is calculated using an exponential algorithm based on the new data event and a previously calculated statistical summary, wherein the new data event is obtained from at least one stream of data events comprising a plurality of data events;
    an analysis system that analyzes the statistical summary after it is updated; and
    a shift system that maintains separate statistical summaries for each of a plurality of different shifts associated with the at least one stream of data events, wherein the shifts are based on reoccurring data trends;
    wherein the new data events from the at least one stream of data events are received at irregular intervals.

2. The system of claim 1, wherein the real time statistical processing system includes a temporary storage for storing the previously calculated statistical summary until a new statistical summary is calculated.

3. The system of claim 2, wherein the shift system includes a system for recognizing a shift change between an old shift and a new shift, and for replacing the previously calculated statistical summary associated with the old shift with a statistical summary associated with the new shift.

4. The system of claim 3, further comprising a shift database for storing statistical summaries for associated shifts.

5. The system of claim 1, wherein the statistical summary comprises a running estimate.

6. The system of claim 1, further comprising a profile database for assigning shift profiles to different streams of data events.

7. A computer readable medium encoded with a computer program product, which when the computer program product is executed, processes a stream of data events based on shifts, the program product comprising:
    computer program code configured for updating a statistical summary each time a new data event is obtained, wherein the statistical summary is calculated using an exponential algorithm based on the new data event and a previously calculated statistical summary, wherein the new data event is obtained from at least one stream of data events comprising a plurality of data events;

computer program code configured for analyzing the statistical summary after it is updated; and computer program code configured for maintaining separate statistical summaries for each of a plurality of different shifts associated with the at least one stream of data events, wherein the shifts are based on reoccurring data trends;

wherein the new data events from the at least one stream of data events are received at irregular intervals.

8. The computer readable medium encoded with the computer program product of claim 7, wherein the previously calculated statistical summary is temporarily stored until a new statistical summary is calculated.

9. The computer readable medium encoded with the computer program product of claim 8, further comprising program code configured for recognizing a shift change between an old shift and a new shift, and for replacing the previously calculated statistical summary associated with the old shift with a statistical summary associated with the new shift.

10. The computer readable medium encoded with the computer program product of claim 9, further comprising program code configured for storing statistical summaries for associated shifts.

11. The computer readable medium encoded with the computer program product of claim 7, wherein the statistical summary comprises a running estimate.

12. The computer readable medium encoded with the computer program product of claim 7, further comprising program code configured for assigning shift profiles to different streams of data events.

13. A method of processing a stream of data events based on shifts, comprising:

obtaining a new data event from at least one stream of data events comprising a plurality of data events;

determining via a microprocessor if there is a shift change from a first shift to a second shift wherein the shifts are based on reoccurring data trends;

when there is no shift change, updating via the microprocessor the statistical summary associated with the first shift using an exponential algorithm;

when there is a shift change:

storing the statistical summary associated with the first shift, replacing the statistical summary associated with the first shift with a statistical summary associated with the second shift, and updating the statistical summary associated with the second shift using an exponential algorithm;

wherein the new data events from the at least one stream of data events are received at irregular intervals.

14. The method of claim 13, wherein determining if there is a shift change from a first shift to a second shift includes comparing a current condition with a shift profile for the at least on stream of data events.

15. The method of claim 14, wherein the current condition comprises a time or an activity.

16. The method of claim 13, further comprising analyzing the statistical summary each time it is updated.

17. The method of claim 13, wherein each statistical summary comprises a running estimate.

\* \* \* \* \*